Figure 1:
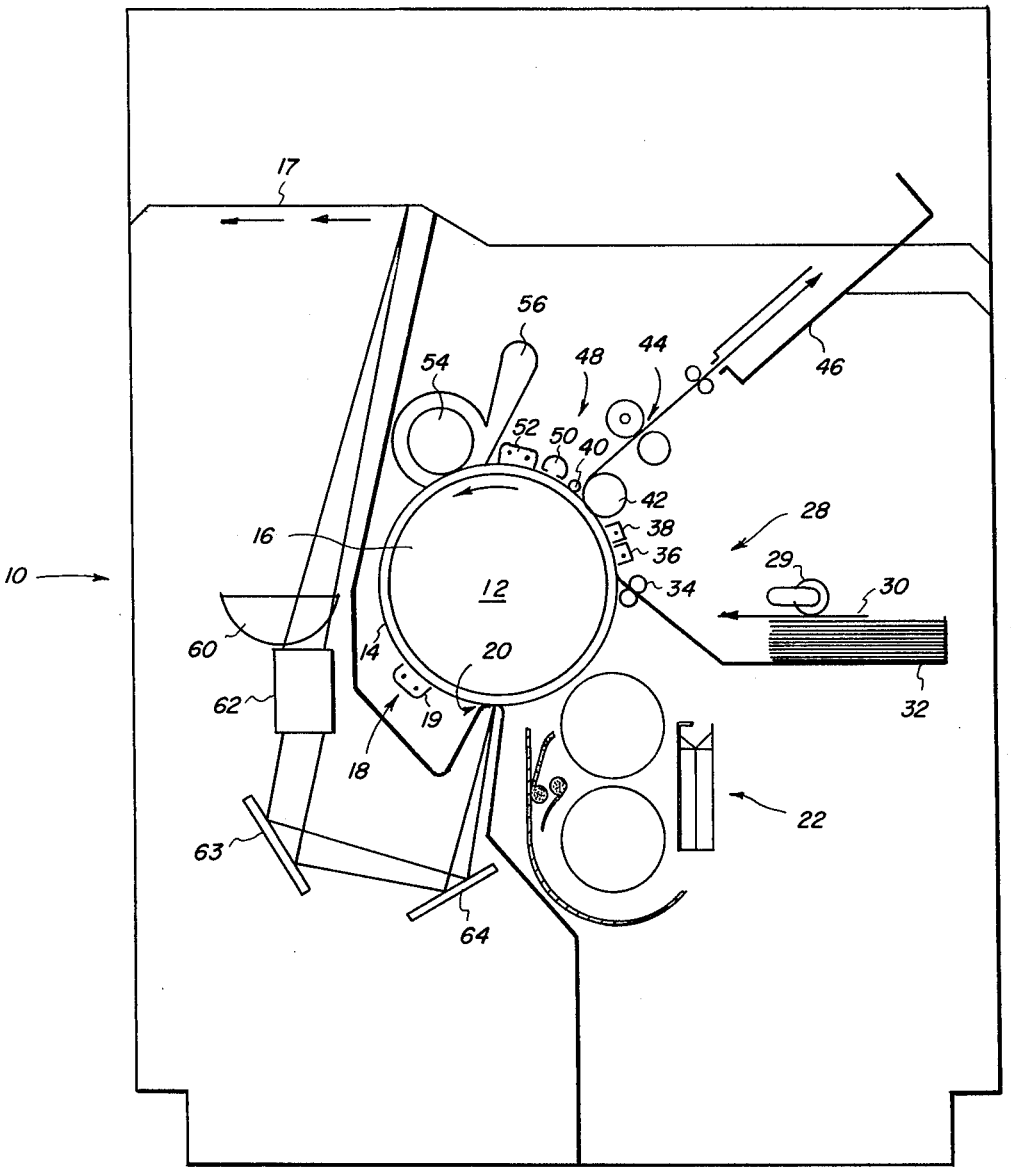
Figure 2:
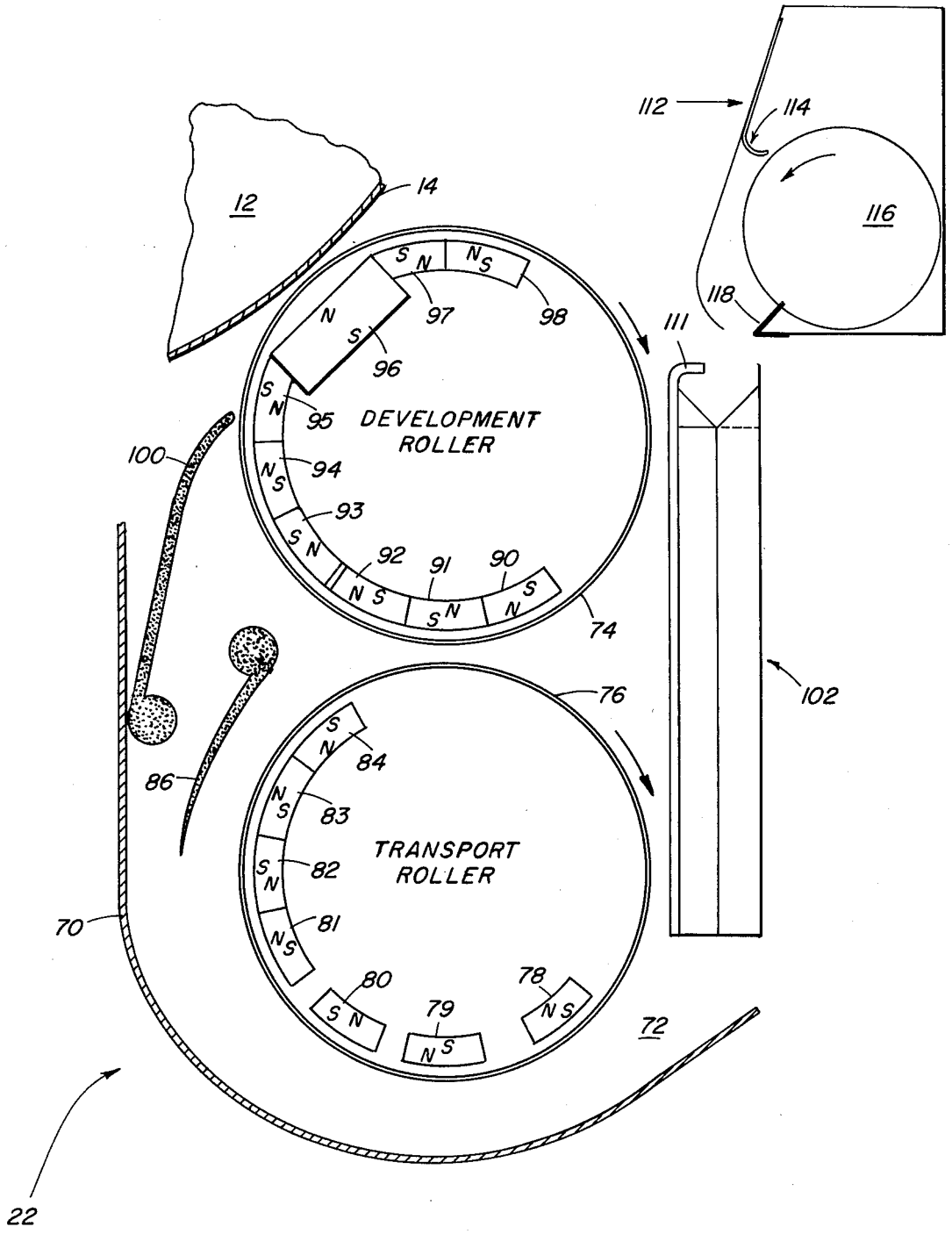
Figure 3:
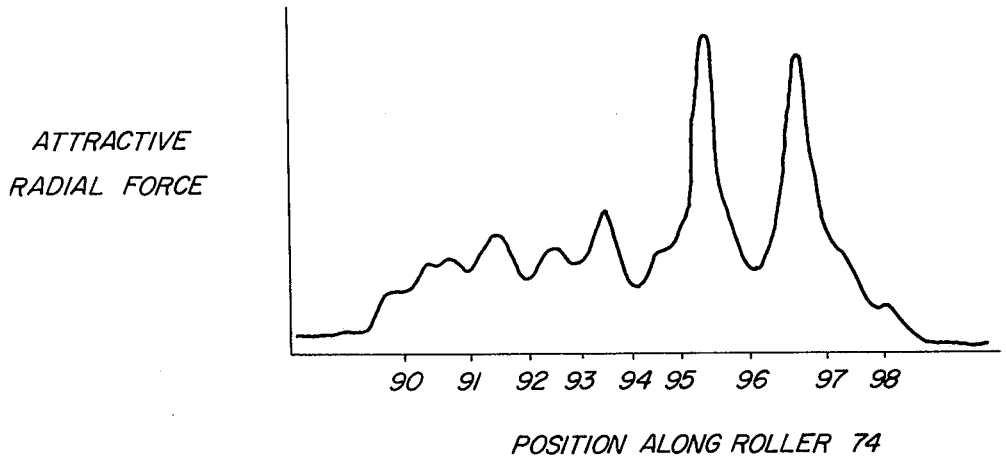
Figure 4:
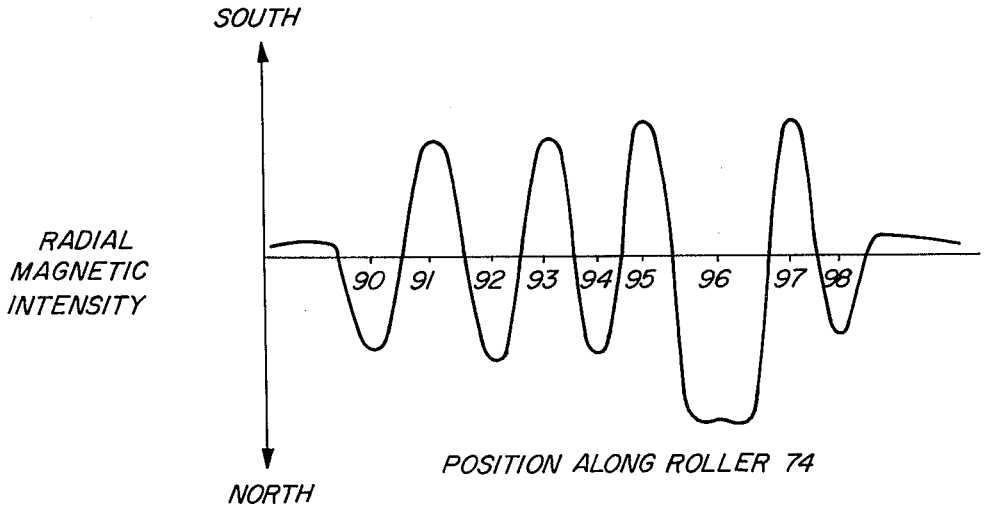

United States Defensive Publication [19] (H) [11] T959,003

Hull [43] June 7, 1977

[54] ELECTROSTATIC PROCESS DEVELOPMENT APPARATUS

[76] Inventor: Joan Helen Hull, Elmgrove Plant, Rochester, N. Y. 14550

[21] Appl. No.: 729,623

[22] Filed: Oct. 5, 1976

[51] Int. Cl.[2] ..... G03G 15/09

[52] U.S. Cl. ..... 118/658; 355/3 DD; 427/18

[57] ABSTRACT

Apparatus for developing a latent image in electrophotographic or electrostatic processes includes a magnet assembly for forming a magnetic developing brush which can be supplied with and carry a developer mix in a development region. The magnet assembly includes a plurality of curved, sector shaped magnets for carrying the mix to and from the development region and a rectangular cross-sectional magnet of greater magnetic force at the development region.

12 Claims, 4 Sheets Drawing,

20 Pages Specification

The file of this unexamined application may be inspected and copies thereof may be purchased (849 O.G. 1221, Apr. 9, 1968).

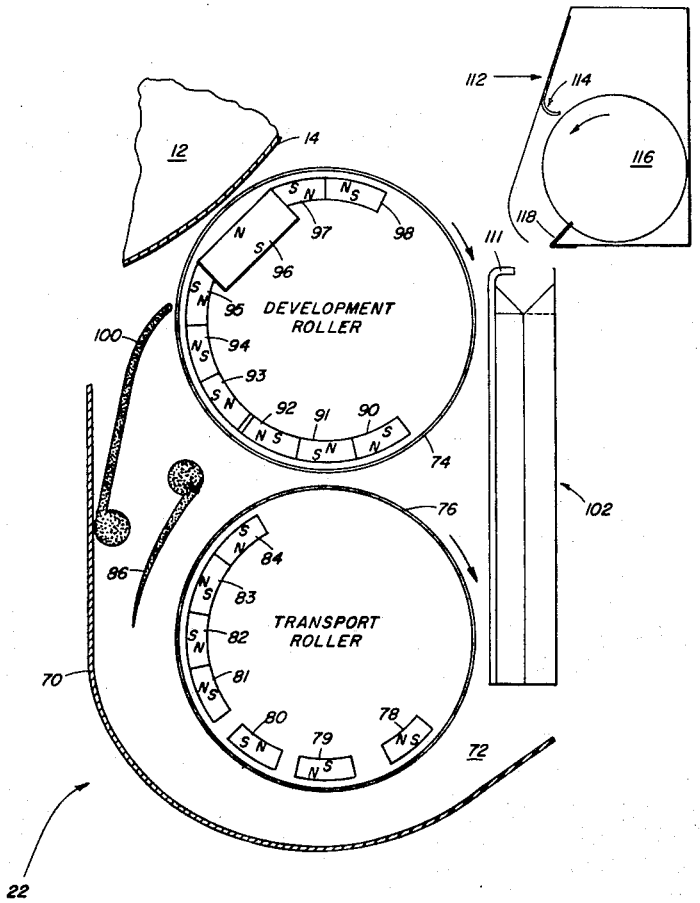

FIG. 6
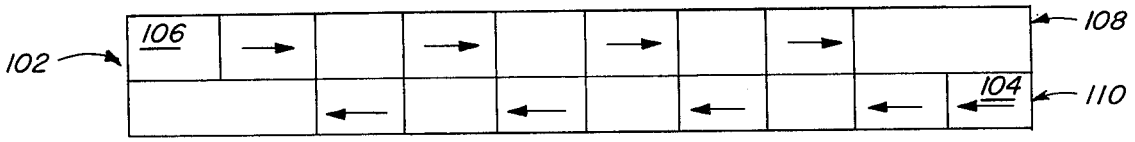
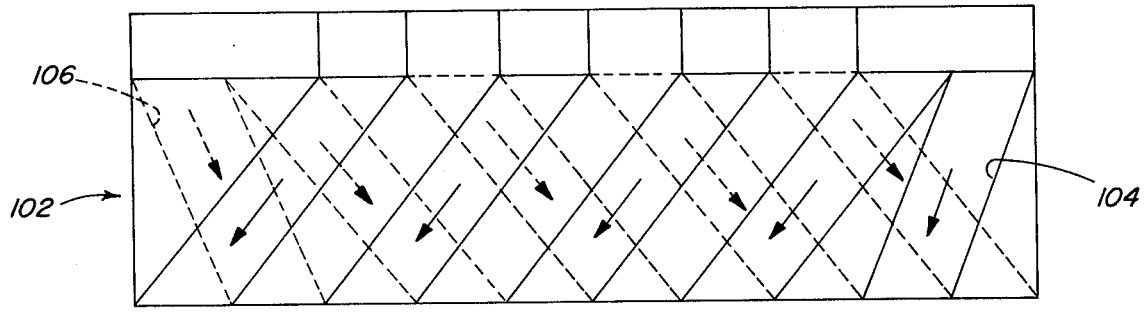
FIG. 5